United States Patent
Schneider et al.

(10) Patent No.: US 10,187,733 B2
(45) Date of Patent: Jan. 22, 2019

(54) METHOD FOR CONTROLLING AND/OR CONFIGURING A USER-SPECIFIC HEARING SYSTEM VIA A COMMUNICATION NETWORK

(71) Applicant: Sonova AG, Stafa (CH)

(72) Inventors: Philipp Schneider, Zurich (CH); Nadim El Guindi, Zurich (CH)

(73) Assignee: SONOVA AG, Stafa (CH)

( * ) Notice: Subject to any disclaimer, the term of this patent is extended or adjusted under 35 U.S.C. 154(b) by 0 days.

(21) Appl. No.: 14/914,013

(22) PCT Filed: Aug. 27, 2013

(86) PCT No.: PCT/EP2013/067735
§ 371 (c)(1),
(2) Date: Feb. 24, 2016

(87) PCT Pub. No.: WO2015/028050
PCT Pub. Date: Mar. 5, 2015

(65) Prior Publication Data
US 2016/0212552 A1 Jul. 21, 2016

(51) Int. Cl.
*H04R 25/00* (2006.01)
*H04R 29/00* (2006.01)
(Continued)

(52) U.S. Cl.
CPC ............ *H04R 25/505* (2013.01); *G10L 13/02* (2013.01); *H04L 67/06* (2013.01); *H04L 67/12* (2013.01);
(Continued)

(58) Field of Classification Search
CPC .... H04R 25/554; H04R 25/55; H04R 25/558; H04R 25/505; H04R 29/004;
(Continued)

(56) References Cited

U.S. PATENT DOCUMENTS 7,502,484 B2 * 3/2009 Ngia .................... G10L 15/02
381/312
8,065,155 B1 * 11/2011 Gazdzinski ........ G06Q 30/0251
704/275
(Continued)

FOREIGN PATENT DOCUMENTS

DE    198 15 373 C2    10/1999
WO    01/54458 A2    7/2001
WO    02/089520 A2    11/2002

OTHER PUBLICATIONS

International Search Report for PCT/EP2013/067735 dated May 22, 2014.
(Continued)

*Primary Examiner* — Yogeshkumar Patel
(74) *Attorney, Agent, or Firm* — Pearne & Gordon LLP

(57) ABSTRACT

A method for controlling and/or configuring a user-specific hearing system using a computing and/or communication device. The hearing system includes at least one hearing device customizable according to the individual hearing ability and/or preferences of a user of the hearing system. The method includes connecting the hearing system to a server via a network, connecting the computing and/or communication device to the server via the network, providing by the server a hearing system control and/or configuration service tailored to the user-specific hearing system to the computing and/or communication device, determining and/or selecting at the computing and/or communication device control data and/or configuration data using the hearing system control and/or configuration service, sending the control and/or configuration data from the computing and/or communication device to the hearing system, and adjusting the hearing system based on control and/or configuration data received at the hearing system.

14 Claims, 4 Drawing Sheets

(51) Int. Cl.
  *H04L 13/02*    (2006.01)
  *H04L 29/08*    (2006.01)
  *G10L 13/02*    (2013.01)

(52) U.S. Cl.
  CPC ........... *H04R 25/55* (2013.01); *H04R 25/558* (2013.01); *H04R 29/004* (2013.01); *H04R 2225/55* (2013.01); *H04R 2460/07* (2013.01)

(58) Field of Classification Search
  CPC .......... H04R 2225/55; H04R 2225/021; H04R 2225/025; H04R 2225/43; H04R 2225/51; H04R 2225/67; H04R 2460/07; H04L 67/06; H04L 67/12; G10L 21/0205; G10L 21/0364; G10L 13/02
  USPC ............... 381/77, 314, 123, 312, 60; 700/94
  See application file for complete search history.

(56) References Cited

U.S. PATENT DOCUMENTS

| | | | | |
|---|---|---|---|---|
| 2005/0251224 A1* | 11/2005 | Berg | ............... | H04R 25/505 607/57 |
| 2005/0283263 A1* | 12/2005 | Eaton | ............... | H04R 25/70 700/94 |
| 2006/0062412 A1* | 3/2006 | Berg | ............... | H04R 25/70 381/312 |
| 2007/0067054 A1* | 3/2007 | Danish | ............... | A47G 33/008 700/94 |
| 2007/0098195 A1* | 5/2007 | Holmes | ............... | H04R 25/558 381/315 |
| 2007/0230711 A1* | 10/2007 | Hasler | ............... | H04R 25/70 381/58 |
| 2009/0047994 A1* | 2/2009 | Sommer | ............... | H04M 1/05 455/556.1 |
| 2009/0238370 A1* | 9/2009 | Rumsey | ............... | H04R 29/00 381/58 |
| 2010/0027822 A1* | 2/2010 | Dietz | ............... | H04R 25/554 381/315 |
| 2010/0158292 A1* | 6/2010 | Pedersen | ............... | H04R 25/55 381/315 |
| 2010/0205447 A1* | 8/2010 | Waldmann | ............... | H04R 25/70 713/182 |
| 2011/0188684 A1* | 8/2011 | Spieler | ............... | G06F 8/65 381/315 |
| 2011/0255702 A1* | 10/2011 | Jensen | ............... | G01H 7/00 381/66 |
| 2011/0257994 A1* | 10/2011 | Givens | ............... | G06F 19/3418 705/2 |
| 2012/0070023 A1* | 3/2012 | Nishizaki | ............... | A61B 5/121 381/314 |
| 2012/0140962 A1* | 6/2012 | Ubezio | ............... | H04R 25/558 381/314 |
| 2012/0183164 A1* | 7/2012 | Foo | ............... | H04R 25/70 381/314 |
| 2012/0183166 A1* | 7/2012 | Schneider | ............... | H04R 25/658 381/314 |
| 2012/0189140 A1* | 7/2012 | Hughes | ............... | H04M 3/56 381/123 |
| 2012/0213393 A1* | 8/2012 | Foo | ............... | H04R 25/554 381/315 |
| 2012/0321094 A1* | 12/2012 | Schiller | ............... | G01H 3/14 381/56 |
| 2013/0024798 A1* | 1/2013 | Schneider | ............... | H04R 25/70 715/771 |
| 2013/0163797 A1* | 6/2013 | Suzman | ............... | H04R 25/50 381/314 |
| 2013/0170661 A1* | 7/2013 | Sigwanz | ............... | H04R 25/70 381/60 |
| 2013/0177189 A1* | 7/2013 | Bryant | ............... | H04R 25/55 381/315 |
| 2013/0202138 A1* | 8/2013 | Nishizaki | ............... | H04R 25/70 381/315 |
| 2013/0251179 A1* | 9/2013 | Aschoff | ............... | G06F 8/31 381/314 |
| 2013/0329924 A1* | 12/2013 | Fleizach | ............... | H04R 25/558 381/314 |
| 2013/0339025 A1* | 12/2013 | Suhami | ............... | H04R 25/00 704/271 |
| 2013/0343583 A1* | 12/2013 | Marcoux | ............... | H04R 25/70 381/314 |
| 2014/0193008 A1* | 7/2014 | Zukic | ............... | H04R 25/70 381/314 |
| 2014/0211973 A1* | 7/2014 | Wang | ............... | H04W 4/02 381/315 |
| 2014/0334629 A1* | 11/2014 | Andersen | ............... | H04R 25/70 381/60 |
| 2014/0355798 A1* | 12/2014 | Sabin | ............... | H04R 25/50 381/314 |
| 2015/0199977 A1* | 7/2015 | Ungstrup | ............... | H04R 25/55 704/260 |
| 2015/0289062 A1* | 10/2015 | Ungstrup | ............... | H04R 25/554 381/314 |
| 2016/0164949 A1* | 6/2016 | Grimstrup | ............... | G06F 17/30 709/203 |
| 2017/0180883 A1* | 6/2017 | Sommer | ............... | H04M 1/05 |
| 2017/0289707 A1* | 10/2017 | Sabin | ............... | H04R 25/50 |

OTHER PUBLICATIONS

Written Opinion for PCT/EP2013/067735 dated May 22, 2014.
ELG, "Specification of Bluetooth System, Core, Version 1.1, Park C, Link Manager Protocol, 3.1 Authentication, 3.3 Pairing, 3.4 Change Link Key, 3.5 Change Current Key", Specification of Bluetooth System, Dec. 1, 1999, pp. 187-199.

\* cited by examiner

METHOD FOR CONTROLLING AND/OR CONFIGURING A USER-SPECIFIC HEARING SYSTEM VIA A COMMUNICATION NETWORK

TECHNICAL FIELD

The present invention is related to a method for controlling and/or configuring a user-specific hearing system, where the hearing system comprises at least one hearing device customisable according to the individual hearing ability and/or preferences of a user of the hearing system.

BACKGROUND OF THE INVENTION

Within the context of the present invention the term "hearing device" refers to hearing aids (alternatively called hearing instruments or hearing prostheses) used to compensate hearing impairments of hard of hearing persons as well as to audio and communication devices used to provide sound signals to persons with normal hearing capability in order to improve their hearing for instance in harsh acoustic surroundings. Such a hearing device is customisable according to the individual hearing ability, requirements and/or preferences of a user of the hearing device, i.e. its capabilities and operational settings can be adapted in a manner that is user-specific, e.g. dependent on the user's hearing loss as determined by means of an audiogram. The term "hearing system" refers to a system comprising multiple separate, operationally connected units, at least one of which is a customisable hearing device as explained above. An example of such a hearing system is a binaural hearing system comprising two hearing devices, one to be worn at the left ear and the other to be worn at the right ear of a user, which are operationally connected to one another either directly or via a separate auxiliary unit such as a hub acting as a communication relay. Auxiliary units (often referred to as hearing device accessories) forming part of the hearing system can provide certain additional functionalities to the hearing system such as for instance the ability to connect with further devices, e.g. a mobile phone, a portable audio player or a television, so as to enable communication with or access to the hearing system. Phonak's iCom, Oticon's ConnectLine and Siemens' Tek/miniTek are examples of communication interface units (or hubs) for hearing systems. Remote control units are a further example of a type of hearing device accessory which can form part of a hearing system.

The configuration and control of known hearing systems takes place by means of dedicated units such as a fitting device or a remote control unit, which are specifically designed to be used in conjunction with certain hearing systems. Moreover, known remote control units and fitting devices are typically connected with a hearing system by means of a proprietary communication scheme. Therefore, any device requiring connectivity with the hearing system will need to implement such a proprietary communication scheme. This makes it difficult and costly to provide a broad variety of devices that can be used in conjunction with a certain hearing system. Examples of prior art solutions are given in the following.

US 2006/0062412 A1 by the present applicant discloses a fitting setup for hearing aids, wherein a cell phone is employed as input device. The cell phone is used to communicate with a server in order to change the fitting setup for the hearing aid to an optimal setting. The cell phone may also be used to communicate personalized data to the network, as well as to update software resident on the hearing aid.

DE 198 15 373 A1 provides a method for programming a hearing aid. The method involves using a prepared modification data set, which is used to alter a base parameter data set stored within a hearing aid, to provide a modified parameter set. The modified data set is matched to the specific hearing situation. The modified data set is obtained by altering the base parameter data set read out by a programming device. The modified data set is stored within the hearing aid alongside the base parameter data set. The base parameter data set may also be available from other sources, for instance it can be downloaded from a network computer. Modified data sets may also be provided to the user by the hearing aid manufacturer, an audiologist or a third party, for example over the Internet. Alternatively, the base parameter data set is transmitted over a network to a central computer, where it is modified and transmitted back over the network as an adjusted data set.

WO 02/089520 A2 presents a method for controlling a hearing aid using a control unit, which is linked to the hearing aid. The hearing aid receives acoustic signals via a microphone, amplifies the signals and outputs them by means of a loudspeaker. In the hearing aid digital signals are processed according to a predetermined algorithm and data concerning the acoustic environment is created and forwarded to the control unit via a communication interface. To improve the quality and ease of operation, it is proposed to analyse the data in the control unit and calculate an optimal algorithm, which is transmitted to the hearing aid via the communication interface.

SUMMARY OF THE INVENTION

It is an object of the present invention to provide an alternative method for controlling and/or configuring a user-specific hearing system. It is especially an aim of the present invention to provide a method which can be applied using a broad range of different devices, and which can be easily implemented rapidly and in a cost effective manner on a large variety of devices featuring various hardware and software capabilities, e.g. based on different processors and operating systems. It is a further goal of the present invention to allow simple and rapid deployment of means for controlling and/or configuring a user-specific hearing system, as well as to enable that they can be promptly and easily updated and up-(/down-)graded.

The object stated above is achieved by a method for controlling and/or configuring a user-specific hearing system by means of a computing and/or communication device, wherein the hearing system comprises at least one hearing device customisable according to the individual hearing ability, requirements and/or preferences of a user of the hearing system, and wherein the proposed method comprises the steps of:
  connecting the hearing system to a server via a network;
  connecting the computing and/or communication device to the server via the network;
  providing by the server to the computing and/or communication device a hearing system control and/or configuration service tailored to the user-specific hearing system;
  determining and/or selecting at the computing and/or communication device control data and/or configuration data using the hearing system control and/or configuration service;

sending the control and/or configuration data from the computing and/or communication device to the hearing system;

adjusting the hearing system, in particular the at least one hearing device, based on control and/or configuration data received at the hearing system.

The computing and/or communication device can for instance be a mobile device, e.g. a smartphone, a cell phone, a personal digital assistant (PDA), or a tablet or laptop computer. Most generally, the computing and/or communication device is any programmable (multi-purpose) device, which is capable of performing a variety of different data processing tasks (beyond those related to the control/configuration of a hearing system), and which can be connected to a network in order to send and receive data. The network, such as the Internet, can itself be comprised of a plurality of various networks, e.g. wireless local area networks (WLANs), mobile communications networks (EDGE, UMTS, LTE), and wide area networks (WANs) based on cable and/or fibre networks.

In an embodiment of the method the control data and/or configuration data is sent from the computing and/or communication device to the hearing system via the server.

In a further embodiment of the method the control and/or configuration data received at the hearing system is the same or equivalent to the control data sent from the computing and/or communication device.

In a further embodiment of the method the control data and/or configuration data is received at the server from the computing and/or communication device, processed by the server, and processed control data and/or configuration data is sent to the hearing system, wherein the control and/or configuration data received at the hearing system is the processed control data and/or configuration data. In this way it is possible for the server to modify the control data and/or configuration data received from the computing and/or communication device, e.g. by applying (complex) processing or taking into account data, e.g. user data or device data specific to the hearing system, which is not available at the computing and/or communication device.

In a further embodiment of the method the hearing system control and/or configuration service provides information, for instance address and/or routing information, enabling to directly send the control data and/or configuration data from the computing and/or communication device to the hearing system, without having to relay this data via the server.

In a further embodiment of the method the hearing system control and/or configuration service is tailored to a user-specific customisation of the hearing system, in particular of the at least one hearing device, customisable according to the individual hearing ability, requirements and/or preferences of a user of the hearing system. Such customisation can be related to the functionalities provided by the hearing device (e.g. the available hearing programs or signal processing functions such as beamforming, (wind) noise cancelling, frequency transposition/compression, active occlusion control, etc.) or the type (behind-the-ear, in-the-ear, completely-in-canal, receiver-in-the-ear/canal, bone anchored, direct acoustic cochlear stimulation middle ear implant, cochlear implant, etc.) and configuration of the hearing device (single/multiple microphone, type of receiver/loudspeaker/transducer, maximum output power, acoustic vent dimensions/mass, etc.) as well as operational and signal processing settings of the hearing device. In the case of a hearing device fitting (configuration) service, the server may provide information to the computing and/or communication device for displaying a user interface customised according to the capabilities of the hearing device, i.e. allowing to make adjustments to settings which are supported by the specific hearing device. Similarly, in the case of a hearing device remote control service, a user interface is provided by the server to the computing and/or communication device, which comprises control elements supported by the hearing device. Furthermore in conjunction with such a remote control service, the present settings of the hearing device can be sent from the hearing device to the server, which then provides this information to the computing and/or communication device where it can be presented by the user interface.

In a further embodiment of the method the user-specific customisation is stored in a database accessible by the server. In the way it is possible to withhold certain (e.g. sensitive) user-specific information from the computing and/or communication device. On the other hand, this also relieves the computing and/or communication device from having to provide storage of its own for such information. Moreover, this assures that such user-specific customisation is centrally accessible for a plurality of different computing and/or communication devices, and that only a single database needs to be kept current and backed-up. Alternatively, the user-specific customisation may be stored in the hearing system, in particular in the at least one hearing device, from which it can be requested by the server.

In a further embodiment of the method the step of providing a hearing system control and/or configuration service comprises at least one of the following:

sending data and/or a script, such as HTML (HyperText Markup Language), JavaScript, CSS (Cascading Style Sheets) or Adobe Flash, to a client, in particular a thin client, such as a web browser, being executed by the computing and/or communication device as a "web application";

providing a web link or web address such as a uniform resource locator (URL) to the computing and/or communication device, the web link allowing to access a web server that makes available program code, in particular a native mobile application, more particularly a mobile client application;

downloading program code, in particular a native mobile application (commonly also referred to as "mobile app"), more particularly a mobile client application, from the server to the computing and/or communication device, installing the program code in the computing and/or communication device, and executing the program code by the computing and/or communication device;

executing program code, referred to as a "cloud application", by the server, and providing an interface to the cloud application via a web browser being executed by the computing and/or communication device, wherein in particular only data entry is performed via the computing and/or communication device and data processing and storage is performed by the server.

In this context, a "web application" is an application that is accessed by the computing and/or communication device over a network such as the Internet, and refers to a computer software application that is coded in a browser-supported programming language (or script) such as JavaScript, combined with a browser-rendered markup language like HTML and reliant on a common web browser to render the application executable. Advantages of using "web apps" are the ability to update and maintain them without distributing and installing software on a multitude of client devices, as well as the inherent support for cross-platform (e.g. Windows, MacOS, Linux, iOS, Android, Windows Phone or BlackBerry OS/10) compatibility. On the other hand "mobile apps" are provided as native code which can only run on a specific device or platform (e.g. a device employing the iOS, Android, Windows Phone or BlackBerry OS/10 operating system). However, such native apps can make use of the specific hardware capabilities of a device, which may not be possible when employing a web app. Finally, in the case of a "cloud app" almost all of the processing is performed by the server and the computing and/or communication device is essentially acting as an input and output (display) device (i.e. an interface/interaction component).

In a further embodiment of the method the data sent to the web browser of the computing and/or communication device and/or the downloaded program code is customised dependent on the user-specific hearing system, in particular dependent on the user-specific customisation of the at least one hearing device.

In a further embodiment the method further comprises upon making changes to the user-specific hearing system, in particular to the user-specific customisation of the at least one hearing device, downloading a program code update from the server to the computing and/or communication device, installing updated program code in the computing and/or communication device, and executing the updated program code by the computing and/or communication device. In this way simple and rapid dissemination of updates and upgrades is supported.

In a further embodiment of the method the step of connecting the hearing system to a server comprises sending a (unique) hearing system/device identifier from the hearing system to the server, and the step of connecting the computing and/or communication device to the server comprises sending a (unique) computing and/or communication device identifier from the computing and/or communication device to the server.

In a further embodiment the method further comprises the step of associating the computing and/or communication device with the hearing system based on at least one of the following:
- the hearing system further sending the (unique) computing and/or communication device identifier to the server;
- the computing and/or communication device further sending the (unique) hearing system/device identifier to the server;
- pairing information, in particular comprising hearing system/device identifier and computing and/or communication device identifier data pairs, stored in a database accessible by the server;
- the hearing system and/or the computing and/or communication device sending account login information, for instance a username and a password, to the server;
- storing account information, in particular information associating usernames with hearing system/device identifier and computing and/or communication device identifier information, in a database accessible by the server.

Associating the computing and/or communication device with the hearing system could also be based on the geographic proximity of the two, for instance determined from position/location data provided by the network (e.g. cell information) and/or the computing and/or communication device and the hearing system/device.

In a further embodiment the method further comprises at least one of the following:
- taking an image of or scanning a visual code, for instance a QR (quick response) code or a bar code, located on a unit of the hearing system, for instance on the at least one hearing device, or a packaging thereof, and extracting the (unique) hearing system/device identifier therefrom, and in particular sending the image or the scan of the visual code from the computing and/or communication device to the server;
- exchanging data, in particular the (unique) hearing system/device identifier, between the hearing system and the computing and/or communication device by means of near-field communication;
- the hearing system, in particular the at least one hearing device, generating a sound sequence representative of the (unique) hearing system/device identifier, the computing and/or communication device recording the sound sequence and sending the recorded sound sequence to the server.

In a further embodiment of the method the step of connecting the hearing system to a server comprises authenticating by the server the hearing system, and/or the step of connecting the computing and/or communication device to the server comprises authenticating by the server the computing and/or communication device.

In a further embodiment of the method authenticating comprises at least one of the following:
- sending an audio file from the server to the computing and/or communication device, outputting the audio file via a loudspeaker of the computing and/or communication device, picking up sound from the loudspeaker by a microphone of the hearing system, in particular of the at least one hearing device, sending the sound picked up by the microphone to the server;
- sending an audio file/signal from the server to the hearing system or the computing and/or communication device, sending the received audio file/signal from the hearing system to the computing and/or communication device or vice versa via a short-range communication link, for instance a Bluetooth link, and sending the received audio file/signal sent via the short-range communication link to the server;
- sending an audio file from the server to the hearing system and to the computing and/or communication device, outputting the audio file via a loudspeaker of the computing and/or communication device, picking up sound from the loudspeaker by a microphone of the hearing system, in particular of the at least one hearing device, extracting at least one characteristic sound feature from both the sound picked up by the microphone and the audio file received by the hearing system and sending information back to the server regarding a comparison result of the at least one extracted characteristic sound feature extracted from the sound picked up by the microphone and from the audio file received by the hearing system;
- sending a PIN (personal identification number) or TAN (transaction number) from the server to the hearing system, converting the PIN or TAN into an audio signal by means of text-to-speech conversion, outputting the audio signal via a receiver of the hearing system, in particular of the at least one hearing device, for the user to hear, the user inputting the heard PIN or TAN into the computing and/or communication device and sending it from the computing and/or communication device to the server;
- both the hearing system and the computing and/or communication device picking up ambient sound by means of their microphones and sending the picked-up audio signal to the server, in particular together with time information, e.g. a time stamp, more particularly both the hearing system and the computing and/or communication device extracting at least one characteristic sound feature from the picked-up audio signal and both the hearing system and the computing and/or communication device sending data regarding the at least one characteristic sound feature to the server.

The latter could also be employed when initially associating the computing and/or communication device with the hearing system, based on the assumption that the two are located in close proximity to one another and therefore are exposed to the same ambient sound.

In a further embodiment of the method the hearing system control and/or configuration service comprises at least one of the following:

fitting the hearing system, in particular the at least one hearing device, to the individual hearing ability and/or preferences of a user;

providing maintenance and/or support information;

selecting a hearing program;

adjusting one or more signal processing parameters of the at least one hearing device, in particular the volume;

selecting an input source of the at least one hearing device;

transferring logged data, for instance usage information of the hearing system or its current operational or signal processing settings, from the hearing system to the computing and/or communication device;

sending a signal picked-up by a microphone or applied to a receiver of the hearing system, in particular of the at least one hearing device, to the computing and/or communication device for remote monitoring and support purposes;

providing auditory training exercises;

performing remote diagnostics of the hearing system;

selecting a hearing program for the at least one hearing device based on location information determined by the computing and/or communication device;

providing location information regarding the hearing system to the computing and/or communication device, for instance to retrieve the hearing system or the at least one hearing device when it has been lost;

disabling by activation at the computing and/or communication device one or more functionalities of the hearing system, for instance in the case when the hearing system has been lost or stolen;

triggering by activation at the computing and/or communication device outputting an acoustic signal via a receiver of the hearing system, in particular of the at least one hearing device, for instance in the case when the hearing system, in particular the at least one hearing device, has been lost or stolen.

It is pointed out that combinations of the above-mentioned embodiments can yield even further, more specific embodiments according to the present invention.

The provision of such "cloud services" could be made dependent on the user of the hearing system paying a (subscription) fee to the provider of the cloud services. Fees could be based on the types of services being subscribed to and the number of computing and/or communication devices associated with the hearing system.

The hearing system provider, e.g. an audiologist could also make use of such cloud services in order to carry out hearing device fitting, support, maintenance and hearing system diagnostics as well as hearing diagnostics of the user. In these cases instead of a mobile device the computing and/or communication device is for instance a desktop computer.

Moreover, a caregiver equipped with a computing and/or communication device, such as a smartphone, working in a nursing home with elder people requiring help with the operation of their hearing systems could use the computing and/or communication device to remotely control a plurality of different hearing systems with the help of the method according to the present invention.

BRIEF DESCRIPTION OF THE DRAWINGS

The present invention is further explained below by means of non-limiting specific embodiments and with reference to the accompanying drawings, which show.

In the figures, like reference signs refer to like parts.

The numbers in parentheses present in FIGS. 2 to 8 are "step sequence numbers" indicating an exemplary order in which individual steps of a process are executed.

DETAILED DESCRIPTION OF THE INVENTION

Figure 1:
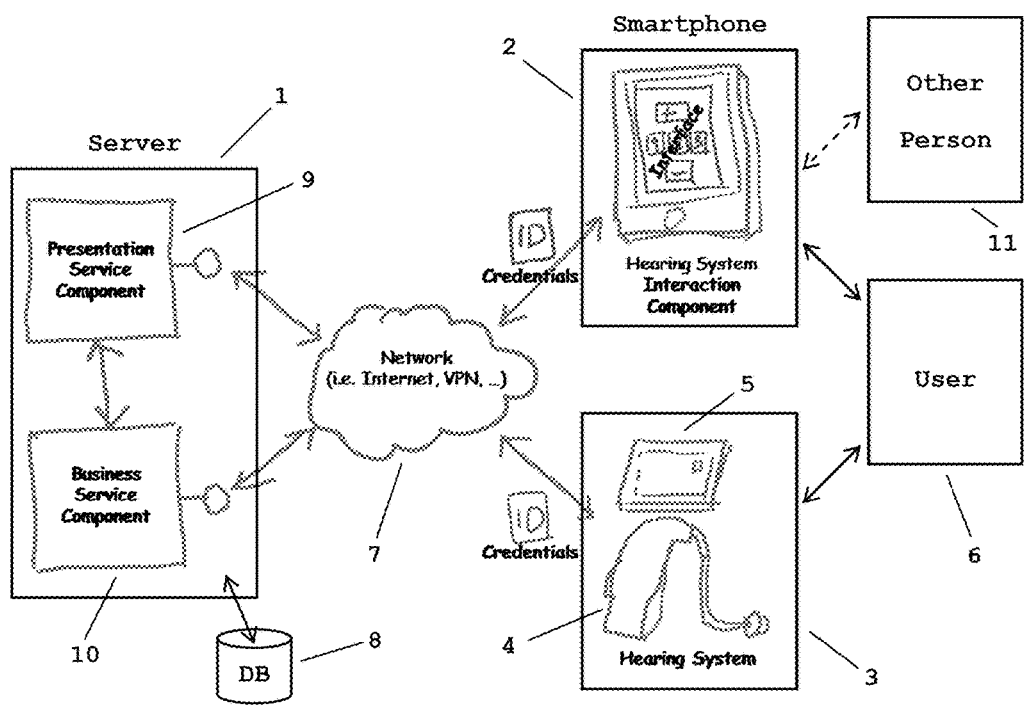
FIG. 1 a high-level block diagram of an exemplary system setup for performing various embodiments of the method according to the present invention.

FIG. 1 illustrates a high-level block diagram of an exemplary system setup for performing various embodiments of the method according to the present invention. A hearing system 3 comprising a hearing device 4 and a hearing device accessory 5 is connected to a network 7, e.g. the Internet. The hearing system 3 could for instance further comprise a second hearing device to provide a binaural fitting. The two hearing devices could be wirelessly connected with each other either directly or via the hearing device accessory 5. The hearing device 4 comprises a microphone, a receiver (i.e. a miniature loudspeaker), a signal processing unit for processing the signal from the microphone and providing a processed signal to the receiver. The hearing device 4 further comprises a transceiver, which enables it to communicate with the hearing device accessory 5, e.g. via a short-range wireless link, such as an inductive link or a low-power Bluetooth link. The shown hearing device accessory 5 is a communication interface unit (hub or relay), which comprises both a short-range transceiver for communicating via the short-range wireless link with the hearing device 4, as well as a further transceiver for communicating via the network 7. It is however also conceivable that the transceiver of the hearing device 4 is capable of communicating via the network 7, in which case the hearing device accessory 5 would not be needed (at least not for communicating via the network 7). The network 7 can itself be comprised of a plurality of different networks. For instance the hearing device accessory 5 (or the hearing device 4) can be connected to a wireless LAN which in turn is connected to the Internet via a cable or fibre link. Furthermore, a computing and/or communication device such as the mobile device 2, e.g. a smartphone, PDA or tablet computer is also connected to the network 7, e.g. via a mobile communications link (EDGE, UMTS, LTE, etc.). The mobile device 2 therefore also comprises a corresponding transceiver as well as a display, input means such as a touchscreen, a processor, a loudspeaker and a microphone. Both the hearing system 3 as well as the mobile device 2 are connected with a server 1 via the network 7. The server 1 is usually located at a remote location, i.e. distant from the hearing system 3, so that it may also be referred to as a remote server. The server 1 is able to associate the hearing system 3 (or even more specifically individual ones of its components such as for instance the hearing device 4) with the mobile device 2, as will be explained later. Based on the association determined by the server 1 between the hearing system 3 and the mobile device 2, a connection can be established between them either via the server 1 (as intermediary) or directly (via the network 7). In the latter case, the server 1 provides the hearing system 3 (more specifically the hearing device accessory 5) and/or the mobile device 2 with address and/or routing information regarding the hearing system 3 (more specifically the hearing device accessory 5) and/or the mobile device 2, so that these devices can directly communicate with each other through the network (without being operationally interconnected via the server 1).

Apart from providing address or routing information to the hearing system 3 and the mobile device 2, the server 1 can provide a variety of different hearing system control and/or configuration services to the mobile device 2. For instance if the user 6 or another person 11 such as a caregiver with access to the mobile device 2 would like to change a setting of the hearing device 4, e.g. change the volume or switch to another hearing program, the mobile device 2 can request a corresponding service (i.e. a hearing system control service) from a business service component 10 being executed on the server 1. The business service component 10 will query a database 8 connected to the server 1 regarding the user-specific customisation of the hearing system 3, e.g. which hearing programs are supported by the hearing device 4. The business service component 10 may further query the hearing device 4 in order to determine its current volume setting and/or the currently selected hearing program. Based on this information the business service component 10 will instruct a presentation service component 9 to download appropriate data to the mobile device 2 (=interaction component). Such data can for instance be a script (e.g. HTML, JavaScript, CSS) that can be executed by a web browser running on the mobile device 2. The script can be used in provide a user interface on the screen of the mobile device 2, for instance with a slider for changing the volume and a selection bar for selecting the desired hearing program. Alternatively, a native app (i.e. device or operating system specific program code) can be downloaded to the mobile device 2, which is then executed to provide the requested remote control functionality. Instead of downloading program code directly from the server 1, the server 1 can provide a web link or web address such as uniform resource locator (URL) to the mobile device 2. This web link can for instance point to a mobile software distribution platform, i.e. an online app store such as Apple's App Store, Google Play, BlackBerry World, Nokia Store, Windows Phone Store, Amazon Appstore. The program code, i.e. a native mobile application (a mobile client application) is then downloaded by the mobile device 2 from the online app store. The user 6 (or other person 11) then selects a hearing program or changes the volume and corresponding data is then sent from the mobile device 2 to the hearing device 4, where an appropriate adjustment is made. As mentioned before the latter data can be sent from the mobile device 2 to the hearing device 4 directly or via the server 1.

As an example of a hearing system configuration service, an audiologist (indicated in FIG. 1 as "other person") 11 would like to fine-tune the fitting of the hearing device 4, e.g. make adjustments to various settings of the signal processing parameters of the hearing device 4 for different hearing situations. In order to do so, the audiologist 11 (also referred to as "fitter" in this case) will send a request for a fitting service from the mobile device 2 to the business service component 10 running on the server 1. The business service component 10 will then query the database 8 in order to determine the specific configuration of the hearing device 4, e.g. which hearing programs are available along with their present standard settings, and which signal processing functions (beamforming, noise cancelling, frequency compression, etc.) are available along with their present standard settings. Alternatively, the business service component 10 could also query the hearing system 3 (or hearing device 4) in order to obtain such information. Based on this information the business service component 10 will instruct the presentation service component 9 to download appropriate data to the mobile device 2. Again this can be a script for being executed by the web browser running on the mobile device 2 or a native app along with required data specific to the hearing device 4. The fitter 11 will then be presented with a user interface on the screen of the mobile device 2 with which he can make changes to the current settings of the hearing device 4. The data input by the fitter 2 via the user interface is then send from the mobile device 2 to the business service component 10 which may process this data by means of a fitting software ("cloud app") being executed on the server 1. The processed data is then sent from the server 1 to the hearing device 4 where it is stored, e.g. as new fitting data. The fitter 11 could further decide that additional functionality is required in the hearing device 4. A selection of additional functions may already be provided by the user interface on the mobile device 2 or can be requested from the business service component 10. Once the fitter 11 has selected the desired functionality along with preferred settings this information is sent from the mobile device 2 to the server 1, where the business service component 10 determines the specific program code suited for being executed by the hearing device 4, and downloads it to the hearing device 4 together with the corresponding settings (configuration data). The hearing device 4 then updates its firmware with the additional function based on the downloaded code and configures the new functionality according to the downloaded configuration data.

Two issues that arise in conjunction with the presently proposed method for controlling and/or configuring a user-specific hearing system 3 are described in the following, namely i) the aspect of associating the mobile device 2 with the hearing system 3 or hearing device 4, in particular identifying each of the two devices 2, 3/4, as well as verifying whether they are authorised to be connected to one another, and ii) the aspect of authenticating the mobile device 2 and the hearing system 3 or hearing device 4, i.e. the process of verifying that the identified devices are in fact "who" they identify themselves as.

Figure 2:
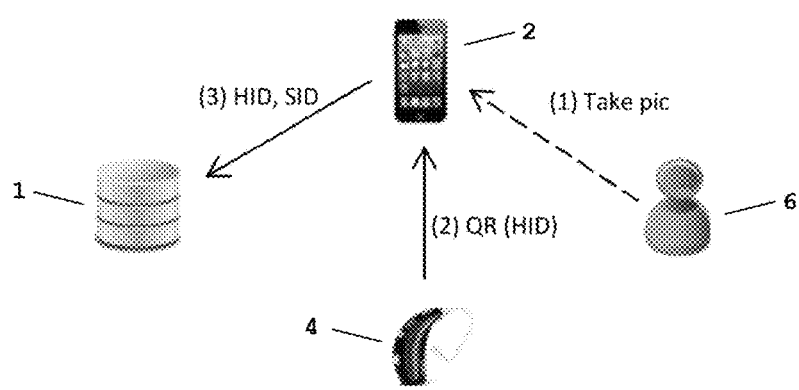
FIG. 2 a schematic illustration of a setup for providing identification information to the server according to an embodiment of the method of the present invention.
Figure 3:
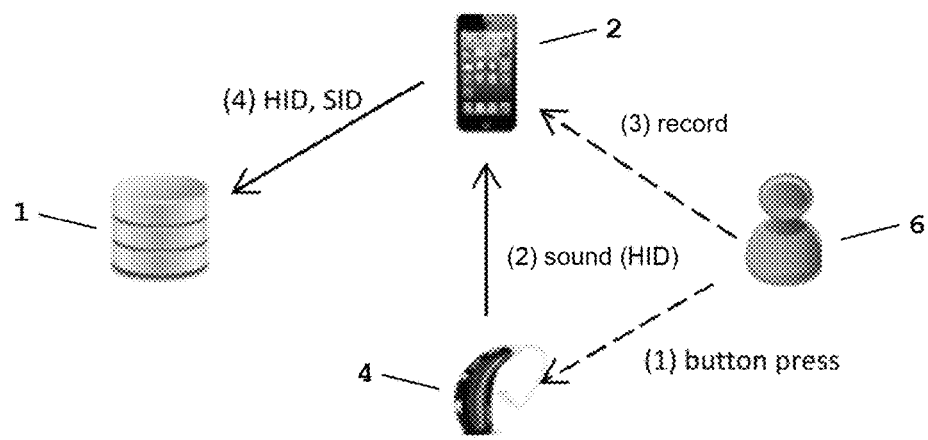
FIG. 3 a schematic illustration of a setup for providing identification information to the server according to a further embodiment of the method of the present invention.
Figure 4:
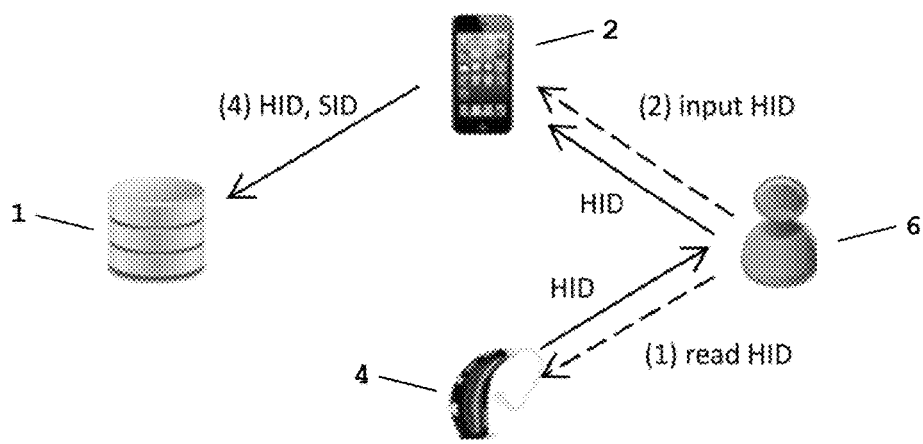
FIG. 4 a schematic illustration of a setup for providing identification information to the server according to another embodiment of the method of the present invention.
Figure 5:
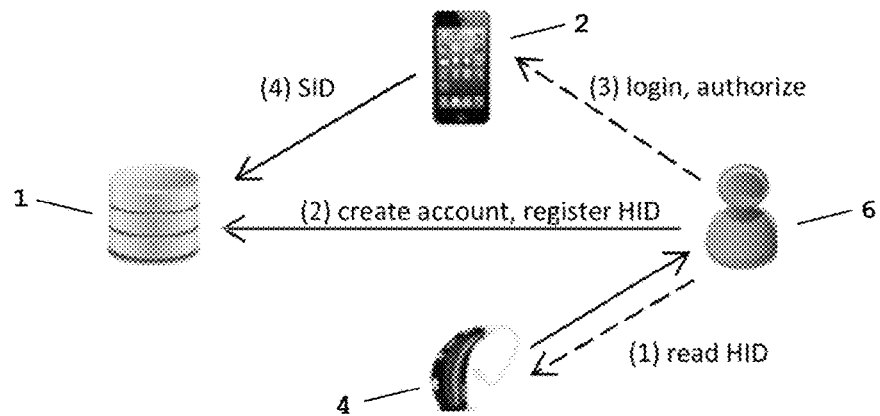
FIG. 5 a schematic illustration of a setup for providing identification information to the server according to yet another embodiment of the method of the present invention.

As part of the process of connecting the mobile device 2 to the server 1, the mobile device 2 sends a unique mobile device identifier (SID, credentials), e.g. a serial number, an International Mobile Station Equipment Identity (IMEI), an Integrated Circuit Card Identifier (ICCID) or a mobile equipment identifier (MEID), to the server 1. Likewise, as part of the process of connecting the hearing system/device 3/4 to the server 1, the hearing system/device 3/4 sends a unique hearing system/device identifier (HID, credentials) such as a serial number to the server 1. As part of the pairing process, i.e. associating the mobile device 2 with the hearing system 3 or hearing device 4, the mobile device 2 can for instance send the hearing system/device identifier of the hearing system 3 or hearing device 4 to which it would like to be connected to the server 1, or conversely the hearing system 3 or hearing device 4 can send the mobile device identifier of the mobile device 2 to which it would like to be connected to the server 1. As illustrated in FIG. 2, the user 6 can take a picture of or scan a visual code, such as a QR code or a bar code, located on the hearing device 4 or a packaging thereof using a camera of the mobile device 2. The hearing system/device identifier HID is then extracted from this image of the visual code and sent from the mobile device 2 to the server 1. Alternatively, the image of the visual code can be sent to the server 1, where the hearing system/device identifier HID is then extracted. The hearing system/device identifier HID of the hearing device 4 can for instance also be read by the mobile device 2 by means of near-field communication (NFC) if the hearing device 4 features a corresponding NFC tag with the HID. As illustrated in FIG. 3, the hearing device 4 can output a sound sequence representative of the hearing system/device identifier HID via its receiver/loudspeaker. The mobile device 2 then records this sound sequence, extracts the hearing system/device identifier HID and sends it to the server 1. Alternatively, the recorded sound sequence can be sent from the mobile device 2 to the server 1, where the hearing system/device identifier HID is extracted. As illustrated in FIG. 4, the user 6 reads the hearing system/device identifier HID from the hearing device 4 or a packaging thereof and enters it into the mobile device 2, e.g. by typing it in or by means of voice entry and speech recognition (i.e. speech-to-text conversion). The mobile device 2 then sends the hearing system/device identifier HID to the server 1. Alternatively, the speech recorded by the mobile device 2 can be sent to the server 1, where speech recognition (i.e. speech-to-text conversion) is performed in order to determine the hearing system/device identifier HID. Alternatively, the hearing system/device identifier HID can also be provided by the hearing device 4 to the user 6 via the receiver/loudspeaker of the hearing device 4 by means of text-to-speech conversion. Pairing can also be achieved by the server 1 based on pairing information, in particular comprising hearing system/device identifier HID and mobile device identifier SID data pairs, stored in the database 8. Furthermore, the hearing device 4 and the mobile device 2 can both be associated with a unique user account set up by means of a registration process. During the registration process, registration information including a unique username and a password are provided by the user 6, for instance by means of a computer (not shown). Thereby, the user can also provide the hearing system/device identifier HID to the server 1. The server 1 then stores this account information together with the hearing system/device identifier HID in the database 8. As part of the process of connecting the hearing device 4 to the server 1, the username and password are sent by the hearing device 4 to the server 1 together with the hearing system/device identifier HID. Likewise, when connecting the mobile device 2 with the server 1, the username and password are entered into the mobile device 2 by the user 6 (or were previously entered and stored in the mobile device 2) and sent by the mobile device 2 to the server 1 together with the mobile device identifier SID. The server 1 will check the login information and thereby verify whether a device is authorised to connect to (an)other device(s) associated with the corresponding user account. The server 1 will then allow connections between the devices which are logged onto a user account, possibly dependent on certain rules stored in the database 8 for instance in the form of a lookup table, or e.g. based on the type of service to be delivered by the server 1.

Figure 6:
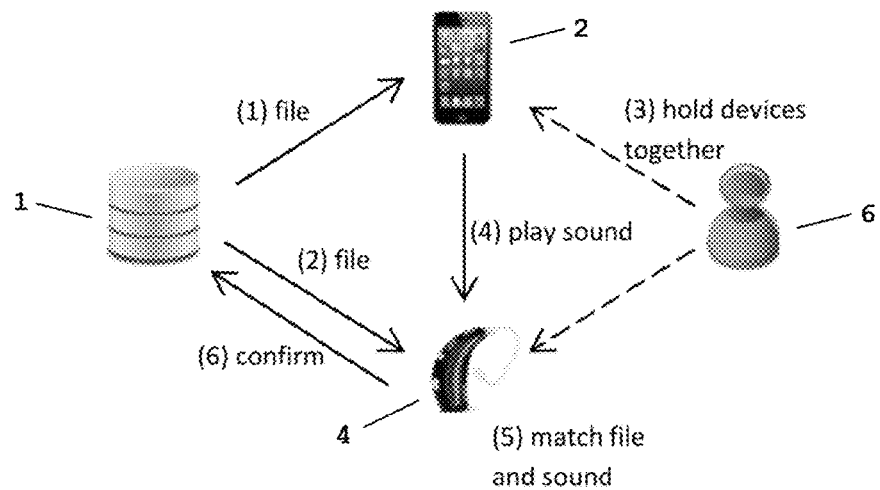
FIG. 6 a schematic illustration of a setup for authenticating the hearing system/device and the computing and/or communication device according to an embodiment of the method of the present invention.
Figure 7:
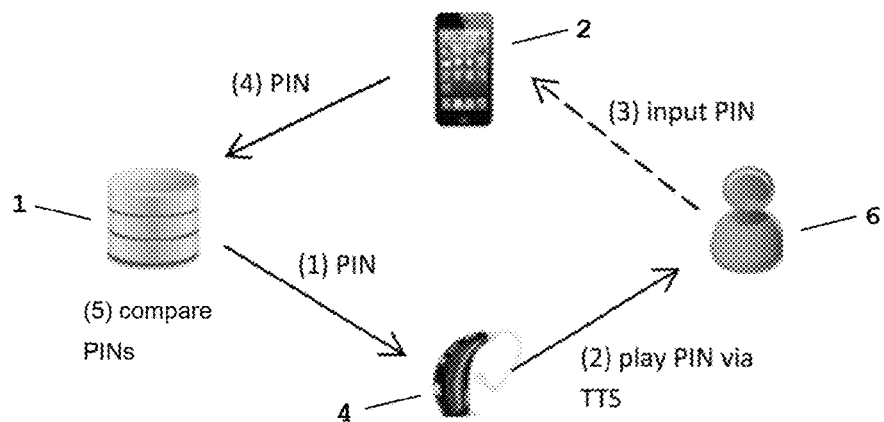
FIG. 7 a schematic illustration of a setup for authenticating the hearing system/device and the computing and/or communication device according to a further embodiment of the method of the present invention.
Figure 8:
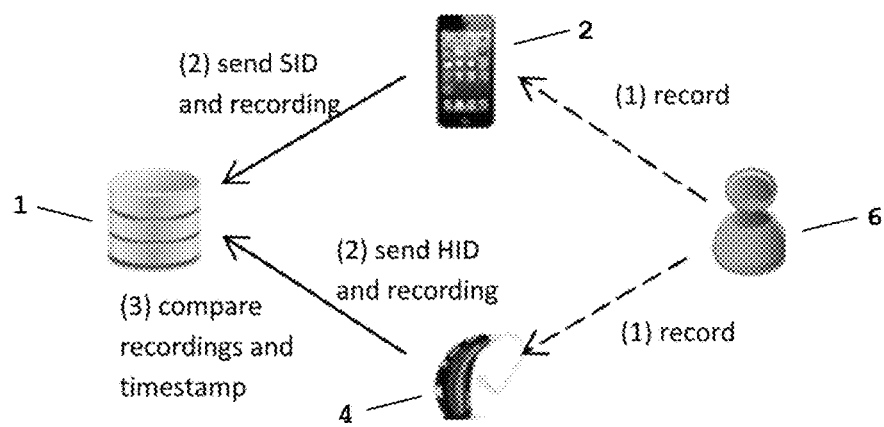
FIG. 8 a schematic illustration of a setup for authenticating the hearing system/device and the computing and/or communication device according to another embodiment of the method of the present invention.

A number of different options are proposed according to the present invention in order to authenticate the hearing system or hearing device 4 and the mobile device 2. This is important in order to ensure the security and privacy of the method according to the present invention. It must especially be guaranteed that no unauthorised person can tamper with the hearing system 3 of the user 6, in order to safeguard the hearing health of the user 6. As illustrated in FIG. 6, the server 1 sends an audio file to the hearing device 4 as well as to the mobile device 2. The mobile device 2 transfers the file to the hearing device 4 acoustically via the loudspeaker of the mobile device 2 where it is picked up by the microphone of the hearing device 4. The hearing device 4 then extracts some characteristic signal feature(s) from both the audio file received from the server 1 as well as from the sound picked up by the microphone. If the extracted features match a positive confirmation is sent to the server 1, and hence the mobile device 2 is authenticated. Alternatively, the audio file received by the mobile device 2 could be transferred to the hearing system 3 via a short-range wireless link, e.g. via Bluetooth. As a further alternative, instead of sending the audio file from the server 1 to the hearing system 3, the hearing system 3 sends the audio file received from the mobile device 2 or picked up from the mobile device 2 by the hearing device's microphone to the server 1, and the server 1 performs characteristic feature extraction and comparison. As a further alternative illustrated in FIG. 7, the server 1 generates a "key" or "code" such as a PIN or TAN and sends it to the hearing system 3. The code is then translated into sound using text-to-speech conversion and played to the user 6 by means of the receiver/loudspeaker of the hearing device 4. The user 6 hears the code and enters it into the mobile device 2. The mobile device 2 then sends the entered code to the server 1. The server 1 verifies the code and thereby authenticates the mobile device 2. The code could also be provided from the hearing system 3 to the mobile device 2 by alternative means, such as for instance the user 6 speaking the code to the mobile device (i.e. voice entry), transmission of the code via short-range wireless link from the hearing system 3 to the mobile device 2, or acoustic transfer of the code from the loudspeaker of the hearing device 4 to the microphone of the mobile device 2. According to yet another alternative, as illustrated in FIG. 8, the hearing device 4 and mobile device 2 both record a current ambient sound and send the recorded acoustical signal (or some characteristic feature(s) extracted therefrom) together with corresponding time stamps and their device identifiers HID, SID to the server 1. This process can be controlled or triggered by the server 1 or the user 6. If the time stamp and sound or characteristic feature(s) match then the two devices are authenticated.

The presented invention therefore provides a simple, scalable, easy to maintain solution to connect a computing and/or communication device such as a mobile device or a desktop computer (e.g. based on the Windows, MacOS, Linux iOS, Android, Windows Phone or Blackberry operating system) with a hearing system through the Internet for remote control and/or configuration purposes. The present invention allows to efficiently serve various types of mobile devices (i.e. "interaction devices") employing different hardware and software technologies, different display resolutions and interaction paradigms, without the need to develop, integrate and test each solution separately. Functionality can be re-used across a wide range of different "frontend" devices, because the biggest part of the functionality is not running on the mobile devices but on a "backend" system, i.e. a server. The mobile devices thereby essentially provide an interface via a (thin-)client to an application being executed by a server.

What is claimed is:

1. A method for controlling and/or configuring a user-specific hearing system (3) by means of a computing and/or communication device (2), the hearing system (3) comprising at least one hearing device (4) customisable according to the individual hearing ability and/or preferences of a user (6) of the hearing system (3), the method comprising the steps of:
   connecting the hearing system (3) to a server (1) via a network (7) by sending a hearing system/device identifier from the hearing system (3) to the server;
   connecting the computing and/or communication device (2) to the server (1) via the network (7) by sending a computing and/or communication device identifier from the computing and/or communication device (2) to the server (1);
   providing by the server (1) to the computing and/or communication device (2) a hearing system control and/or configuration service tailored to the user-specific hearing system (3);
   determining and/or selecting at the computing and/or communication device (2) control data and/or configuration data using the hearing system control and/or configuration service;
   sending the control and/or configuration data from the computing and/or communication device (2) to the hearing system (3);
   adjusting the hearing system (3) based on control and/or configuration data received at the hearing system (3),
   wherein the hearing system control and/or configuration service provides a user interface individually customized according to capabilities of the user's hearing device.

2. The method of claim 1, wherein the control data and/or configuration data is sent from the computing and/or communication device (2) to the hearing system (3) via the server (1).

3. The method of claim 2, wherein the control data and/or configuration data is received at the server (1) from the computing and/or communication device (2), processed by the server (1), and processed control data and/or configuration data is sent to the hearing system (3), and wherein the control and/or configuration data received at the hearing system (3) is the processed control data and/or configuration data.

4. The method of claim 1, wherein the hearing system control and/or configuration service provides information, for instance address and/or routing information, enabling to directly send the control data and/or configuration data from the computing and/or communication device (2) to the hearing system (3).

5. The method of claim 1, wherein the hearing system control and/or configuration service is tailored to a user-specific customisation of the hearing system (3) customisable according to the individual hearing ability and/or preferences of a user (6) of the hearing system (3).

6. The method of claim 5, wherein the user-specific customisation is stored in a database (8) accessible by the server (1).

7. The method of claim 1, wherein the step of providing a hearing system control and/or configuration service comprises at least one of the following:
   sending data and/or a script, such as HTML, JavaScript, CSS or Adobe Flash, to a client, in particular a thin client, such as a web browser, being executed by the computing and/or communication device (2) as a web application;
   providing a web link or web address such as a uniform resource locator to the computing and/or communication device (2), the web link allowing to access a web server that makes available program code, in particular a native mobile application, more particularly a mobile client application;
   downloading program code, in particular a native mobile application, more particularly a mobile client application, from the server (1) to the computing and/or communication device (2), installing the program code in the computing and/or communication device (2), and executing the program code by the computing and/or communication device (2);
   executing program code, referred to as a cloud application, by the server (1), and providing an interface to the cloud application via a web browser being executed by the computing and/or communication device (2), wherein in particular only data entry is performed via the computing and/or communication device (2) and data processing and storage is performed by the server (1).

8. The method of claim 7, wherein the data sent to the web browser of the computing and/or communication device (2) and/or the downloaded program code is customised dependent on the user-specific hearing system (3), in particular dependent on the user-specific customisation of the at least one hearing device (4).

9. The method of claim 7, further comprising upon making changes to the user-specific hearing system (3), in particular to the user-specific customisation of the at least one hearing device (4), downloading a program code update from the server (1) to the computing and/or communication device (2), installing updated program code in the computing and/or communication device (2), and executing the updated program code by the computing and/or communication device (2).

10. The method of claim 1, further comprising the step of associating the computing and/or communication device (2) with the hearing system (3) based on at least one of the following:

the hearing system (3) further sending the computing and/or communication device identifier to the server (1);

the computing and/or communication device (2) further sending the hearing system/device identifier to the server (1);

pairing information, in particular comprising hearing system/device identifier and computing and/or communication device identifier data pairs, stored in a database (8) accessible by the server (1);

the hearing system (3) and/or the computing and/or communication device (2) sending account login information, for instance a username and a password, to the server (1);

storing account information, in particular information associating usernames with hearing system/device identifier and computing and/or communication device identifier information, in a database (8) accessible by the server (1).

11. The method of claim 10, further comprising at least one of the following:

taking an image of or scanning a visual code, for instance a QR code or a bar code, located on the at least one hearing device (4) or a packaging thereof, and extracting the hearing system/device identifier therefrom, and in particular sending the image or the scan of the visual code from the computing and/or communication device (2) to the server (1);

exchanging data, in particular the hearing system/device identifier, between the hearing system (3) and the computing and/or communication device (2) by means of near-field communication;

the hearing system (3) generating a sound sequence representative of the hearing system/device identifier, the computing and/or communication device (2) recording the sound sequence and sending the recorded sound sequence to the server (1).

12. The method of claim 1, wherein the step of connecting the hearing system (3) to a server (1) comprises authenticating by the server (1) the hearing system (3), and/or the step of connecting the computing and/or communication device (2) to the server (1) comprises authenticating by the server (1) the computing and/or communication device (2).

13. The method of claim 12, wherein authenticating comprises at least one of the following:

sending an audio file from the server (1) to the computing and/or communication device (2), outputting the audio file via a loudspeaker of the computing and/or communication device (2), picking up sound from the loudspeaker by a microphone of the hearing system (3), sending the sound picked up by the microphone to the server (1);

sending an audio file/signal from the server (1) to the hearing system (3) or the computing and/or communication device (2), sending the received audio file/signal from the hearing system (3) to the computing and/or communication device (2) or vice versa via a short-range communication link, for instance a Bluetooth link, and sending the received audio file/signal sent via the short-range communication link to the server (1);

sending an audio file from the server (1) to the hearing system (3) and to the computing and/or communication device (2), outputting the audio file via a loudspeaker of the computing and/or communication device (2), picking up sound from the loudspeaker by a microphone of the hearing system (3), extracting at least one characteristic sound feature from both the sound picked up by the microphone and the audio file received by the hearing system (3) and sending information back to the server (1) regarding a comparison result of the at least one extracted characteristic sound feature extracted from the sound picked up by the microphone and from the audio file received by the hearing system (3);

sending a PIN or TAN from the server (1) to the hearing system (3), converting the PIN or TAN into an audio signal by means of text-to-speech conversion, outputting the audio signal via a receiver of the hearing system (3) for the user (1) to hear, the user (1) inputting the heard PIN or TAN into the computing and/or communication device (2) and sending it from the computing and/or communication device (2) to the server (1);

both the hearing system (3) and the computing and/or communication device (2) picking up ambient sound by means of their microphones and sending the picked-up audio signal to the server (1), in particular together with time information, e.g. a time stamp, more particularly both the hearing system (3) and the computing and/or communication device (2) extracting at least one characteristic sound feature from the picked-up audio signal and both the hearing system (3) and the computing and/or communication device (2) sending data regarding the at least one characteristic sound feature to the server (1).

14. The method of claim 1, wherein the hearing system control and/or configuration service comprises at least one of the following:

fitting the hearing system (3), in particular the at least one hearing device (4), to the individual hearing ability and/or preferences of the user (6);

providing maintenance and/or support information;

selecting a hearing program;

adjusting one or more signal processing parameters of the at least one hearing device (4), in particular the volume;

selecting an input source of the at least one hearing device (4);

transferring logged data, for instance usage information of the hearing system (3) or its current operational or signal processing settings, from the hearing system (3) to the computing and/or communication device (2);

sending a signal picked-up by a microphone or applied to a receiver of the at least one hearing device (4) to the computing and/or communication device (2) for remote monitoring and support purposes;

providing auditory training exercises;

performing remote diagnostics of the hearing system (3);

selecting a hearing program for the at least one hearing device (4) based on location information determined by the computing and/or communication device;

providing location information regarding the hearing system (3) to the computing and/or communication device (2), for instance to retrieve the hearing system (3) or the at least one hearing device (4) when it has been lost or stolen;

disabling by activation at the computing and/or communication device (2) one or more functionalities of the hearing system (3), for instance in the case when the hearing system (3) has been lost or stolen;

triggering by activation at the computing and/or communication device (2) outputting an acoustic signal via a receiver of the hearing system, in particular of the at least one hearing device (4), for instance in the case when the hearing system, in particular the at least one hearing device, has been lost or stolen.

* * * * *

UNITED STATES PATENT AND TRADEMARK OFFICE
CERTIFICATE OF CORRECTION

PATENT NO. : 10,187,733 B2  
APPLICATION NO. : 14/914013  
DATED : January 22, 2019  
INVENTOR(S) : Philipp Schneider et al.

Page 1 of 1

It is certified that error appears in the above-identified patent and that said Letters Patent is hereby corrected as shown below:

In the Specification

Column 12, Line 61, "mobile device" should be -- mobile device 2 --.

Signed and Sealed this  
Twenty-seventh Day of August, 2019

Andrei Iancu  
*Director of the United States Patent and Trademark Office*